J. Quigley,
Cage Trap,
№ 32,434.  Patented May 28, 1861.
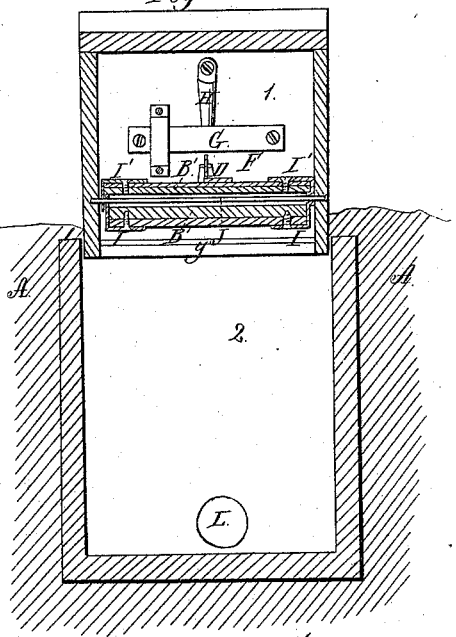
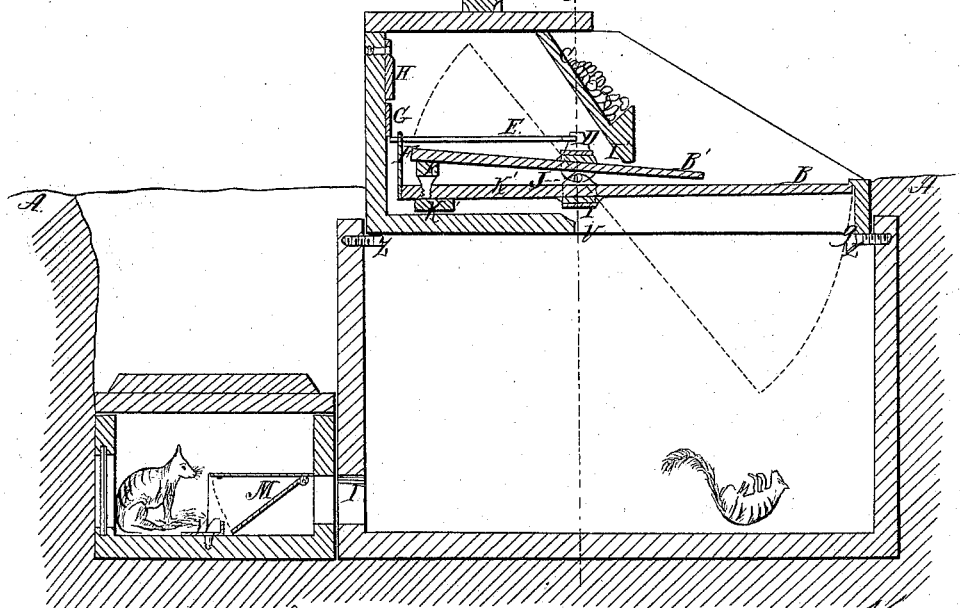
Witnesses: Goodwin Y. Abbe, G. F. G. Dieterich
Inventor: J. Quigley

UNITED STATES PATENT OFFICE.

JOHN QUIGLEY, OF WINONA, MINNESOTA.

IMPROVEMENT IN ANIMAL-TRAPS.

Specification forming part of Letters Patent No. 32,434, dated May 28, 1861.

*To all whom it may concern:*

Be it known that I, JOHN QUIGLEY, of the city and county of Winona, and State of Minnesota, have invented certain new and useful Improvements in Squirrel-Traps; and I do hereby declare the following to be a full, clear, and exact description thereof, reference being had to the accompanying drawings, making part of this specification, in which—

Figure 1 represents a longitudinal vertical section through the device, and Fig. 2 a vertical transverse section of the same.

Similar letters of reference represent like parts in each of the accompanying drawings.

My invention is designed particularly for catching squirrels, and as in such a trap it is essential that a direct and large entrance-passage to the bait-box be provided, I have arranged the several parts in such a manner that this important requisite be fulfilled, and it is this particular arrangement of the parts that constitutes my invention.

I am aware that in a rat-trap two platforms have been so arranged together that one supports the rat until he comes upon the other, and then both move together and precipitate the rat into a pit; but I am not aware that two platforms have been attached directly to one and the same axial rod; nor am I aware that the upper platform has had a crank-arm and trigger-rod connected to it in the manner I show; nor am I aware that the upper platform has been arranged so that the animal in passing to the bait-box is compelled to tread directly upon its front edge; nor am I aware that the upper platform has been arranged so that its rear end rests upon a screw, and said platform may be so adjusted, as occasion may require, as to insure a perfect operation of the trigger or retaining-rod; nor am I aware that all of the working parts of the trap have been hidden from view by an inclined partition, which answers as a shelf or support for the bait.

To enable others skilled in the art to make and use my invention, I will proceed to describe its construction and operation.

A box 1, containing the platforms and bait and provided with a trap-hole in the bottom, as seen at Y Y, is placed on a number of screws Z projecting from the inside of a pit-box 2. This pit-box is sunk in the ground so that the platforms are about level with the surface A A of the ground. A platform B, extending nearly the whole length of the box 1, is hung on a central pivot-rod J. This platform is properly balanced by means of a weight K'', attached to its rear end. Another shorter platform B' is also hung to the pivoted rod J by means of flanges I', extending underneath the platform B'. A button projecting from the under surface of the rear end of the platform B' rests against the head of a screw K', projecting from the upper surface of the rear end of the larger platform. It will be seen that by screwing the screw K' higher or lower the front end of the platform B' can be adjusted at the proper height above the level of platform B. A rod E is hung to an arm D, projecting from the upper platform. The rear end of this rod slides through a hole in a bracket F, extending upward from the rear end of platform B.

When setting the trap, a latch G, pivoted at one end to the rear side of box 1, is brought to bear against the end of rod E, as represented in Fig. 1.

A board C prevents the animal entering the box from getting into the rear part of box 1, and serves also to support a little box containing the bait O.

When the animal enters the box 1 and treads on platform B, the platform is kept suspended by reason of the end of rod E abutting against latch G; but as soon as the animal treads on the front end of the smaller platform B', attracted by the bait, the front end of platform B' is depressed by the weight of the animal, and the arm D swings back, withdrawing the end of rod E from underneath the latch G, and both platforms swing on their pivot J, so as to precipitate the animal into the pit-box 2. As soon as the animal is off the platforms the latter swing back in obedience to the balancing-weight K'', and the top of the pit-box is thus closed, so as to cut off the escape of the animal. The animal in running around in the pit-box will finally try to escape through hole L, leading from the pit-box into reception-box 3. In rushing through this hole the animal lifts the inclined gate M, pivoted just above the hole L in box 3, and enters this box. The gate falls down, assuming its original position by its own weight as soon as the animal has passed underneath it, and cannot be lifted from the inside of box 3, as the guard N prevents the animal from getting at the edge of the gate resting against the bottom of the box, as represented in Fig. 1.

The whole constitutes a simple and effective trap, not liable to get out of order, and easily transported.

I do not claim anything exhibited in the rat-trap patented by R. M. Turner in 1858; but What I do claim as my invention, and desire to secure by Letters Patent, is—

The arrangement of the platforms B B', axial pivot J, common to both platforms, crank-arm D, trigger or retaining-rod E, stop-latch G, adjusting-screw K', box 1, inclined bait-supporting division-board C, and pit 2, the whole being constructed and used together in the manner and for the purpose set forth.

The above specification of my improvement in traps signed by me this 11th day of July, 1860.

JOHN QUIGLEY.

Witnesses:
WM. FRY,
WM. MITCHELL.